US005286003A

United States Patent [19]

Chuang

[11] Patent Number: 5,286,003

[45] Date of Patent: Feb. 15, 1994

[54] JACK

[76] Inventor: Ching-Pao Chuang, No. 120-18, Yu Che, Yu Che Li, Ma Tou Chen, Tainan Hsien, Taiwan

[21] Appl. No.: 15,424

[22] Filed: Feb. 9, 1993

[51] Int. Cl.[5] .......... B60S 9/02

[52] U.S. Cl. .......... 254/103

[58] Field of Search .......... 254/103, 98; 269/181, 269/182; 74/425

[56] References Cited

U.S. PATENT DOCUMENTS

| | | | |
|---|---|---|---|
| 1,002,982 | 9/1911 | Foster | 269/181 |
| 3,790,133 | 2/1974 | Jones | 254/103 |
| 4,809,962 | 3/1989 | Lee | 269/182 |

*Primary Examiner*—Robert C. Watson

*Attorney, Agent, or Firm*—Morton J. Rosenberg; David I. Klein

[57] ABSTRACT

A jack is provided which includes a vertical lift rod which is disposed within a tubular housing and has a male thread formed on its longitudinal body. Two guide blocks are included with each having a recess with a half female thread formed therein, the two blocks together forming a complete female thread to engage or disengage from the male thread of the lift rod. The lift rod can be lifted up by its rotation within the female thread, when the lift rod is rotated by a handle connected with a worm engaging a worm gear. The worm gear has two keys formed on its inner wall for receipt within two respective longitudinal slots of the lift rod for engagement thereof. The lift rod can be rapidly lowered by displacement of the two guide blocks away from engagement with the lift rod. A rack and pinion arrangement is provided for displacement of the guide blocks responsive to rotation of a handle coupled to the pinion.

1 Claim, 2 Drawing Sheets

JACK

BACKGROUND OF THE INVENTION

Nowadays a wide variety of jacks are in use, such as those functioned by air pressure, oil pressure of mechanical means. However, air pressure jacks have a drawback of malfunction caused by air leaking and oil-pressure ones have a drawback of oil leakage caused by small ruptures of oil seals and ensuing blockage caused by dirt adhered to oil which has leaked out. Another common disadvantage of conventional jacks is their low speed in lowering down, after having been raised up.

SUMMARY OF THE INVENTION

This invention has been devised to offer a jack operated by a mechanism without using air or oil, and capable to be lowered down very quickly.

The jack in the present invention includes a lift rod having a male thread along its longitudinal body to engage or disengage from a female thread formed by two half female threads in two semi-round notches in two straight sides of two guide blocks so that the lift rod can be lifted up by the female thread of the guide blocks when the lift rod is rotated by a worm gear which in turn is rotated by a worm, the worm being rotated manually with a turning handle.

After the lift rod is lifted up and finished in its use, the lift rod can be lowered down by its own weight by retracting the guide blocks to separate them from the lift rod and thereby disengage the female thread of the guide blocks from the male thread of the lift rod. Retracting of the guide blocks is performed by a toothed rod engaging a rack provided on an upper surface of one guide block, the toothed rod being combined with a handle and rotated thereby so that the toothed rod can move the guide blocks nearer to, or further from the lift rod for engagement or disengagement thereof.

BRIEF DESCRIPTION OF THE DRAWINGS

The invention will be better understood by reference to the accompanying drawings, wherein.

REMARKS

Figure 2:
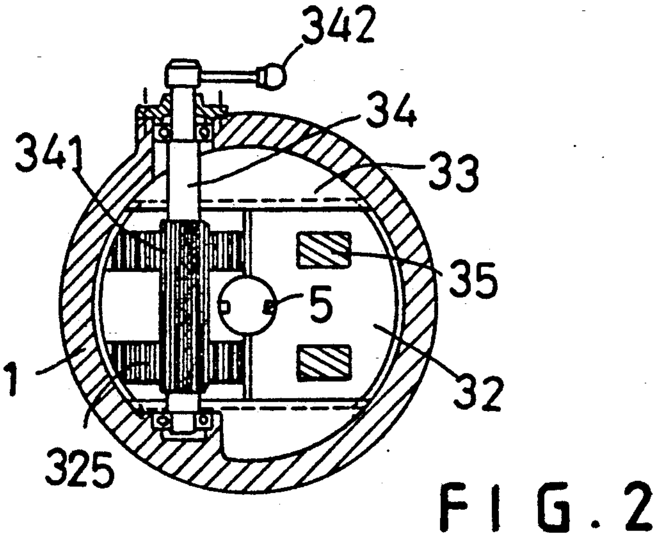
FIG. 2 is a cross-sectional view taken along section line 2—2 of FIG. 1.
Figure 1:
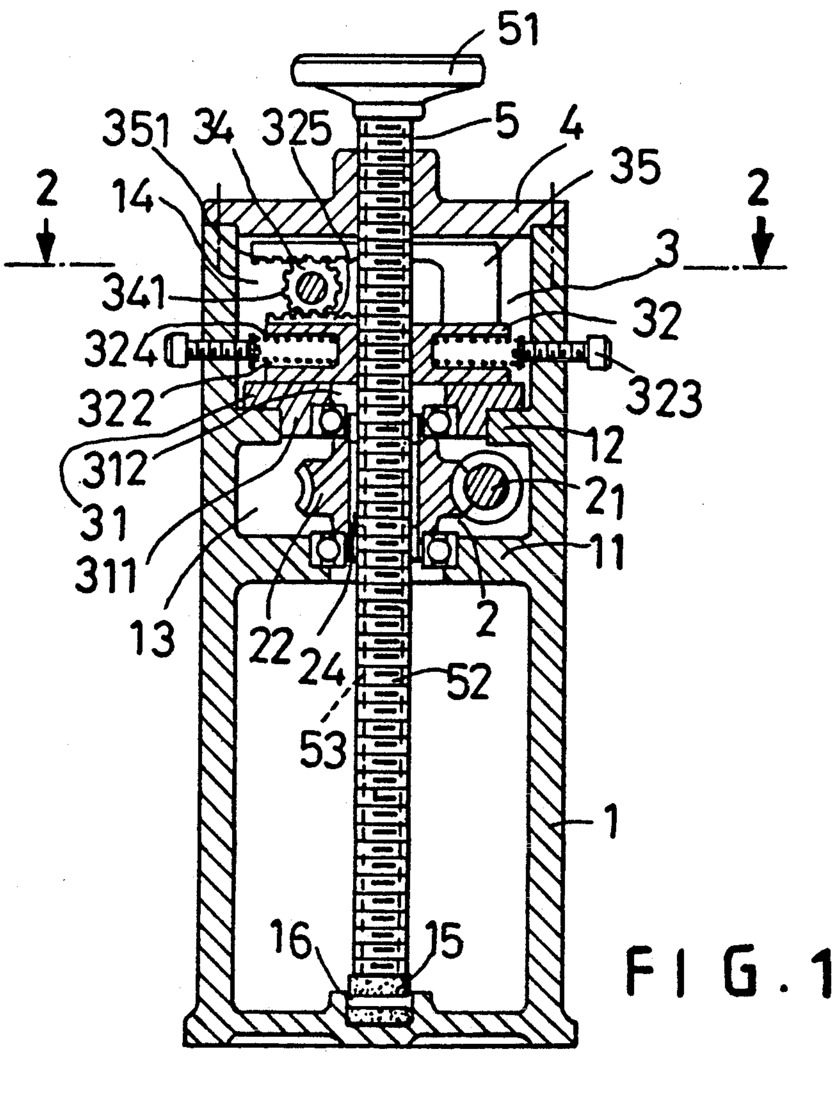
FIG. 1 is a cross-sectional view of a jack in the present invention.
Figure 3:
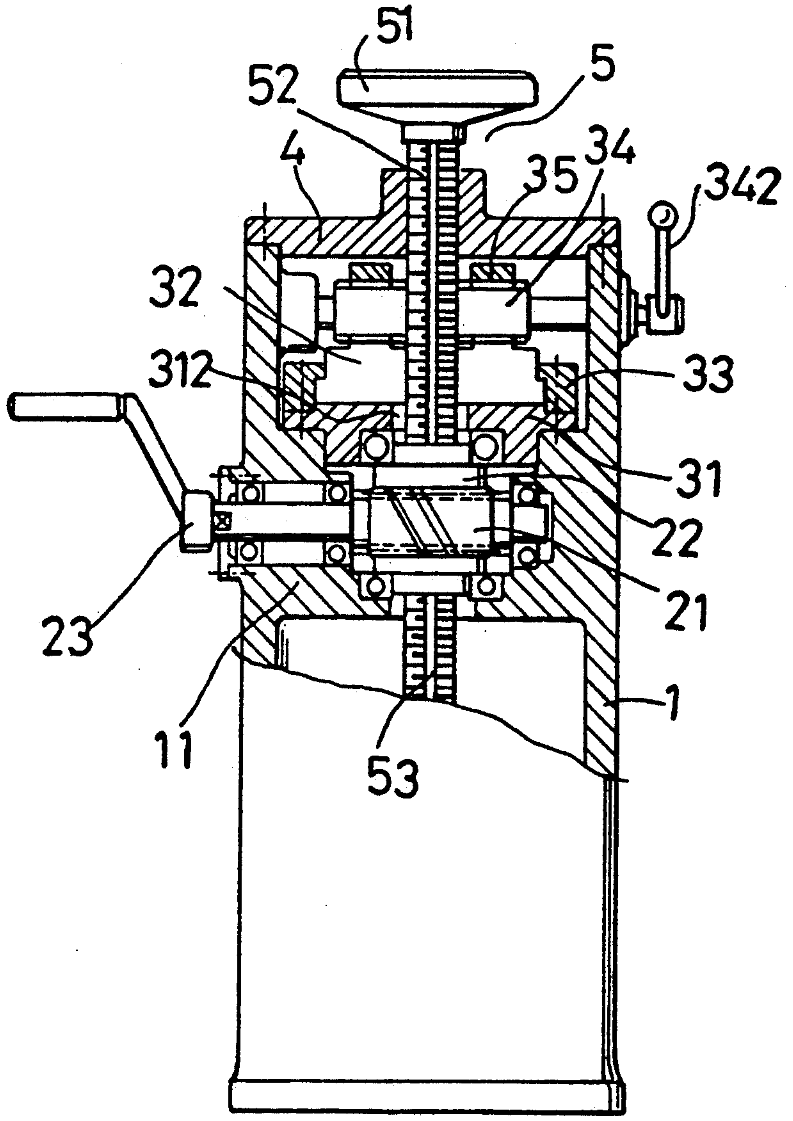
FIG. 3 is a partial cross-sectional view of the other side of the jack of FIG. 1; and, FIG. 4 is a cross-sectional view of a moving block of a guide unit retracted in the present invention.

A jack in the present invention as shown in FIGS. 1, 2, 3, comprises a housing 1, a transmission unit 2, a guide unit 3, an outer cap 4 and a lift rod 5 as main components.

The housing 1 is of a hollow tubular shape, having two annular ridges 11, 12 extending horizontally inward and spaced apart to form a lower chamber 13 for depositing the transmission unit 2 and an upper chamber 14 for depositing the guide unit 3, and a central round recess 16 in a bottom for a spring 15 to sit therein to receive a bottom end of the lift rod 5.

The transmission unit 2 has a worm 21 and a worm gear 22 engaging the worm 21, which extends horizontally out of the housing and connected with a turning handle 23 for rotating the worm 21. The worm gear 22 has two keys 24, 24 in opposite inner walls to fit in two longitudinal slots of the lift rod 5.

The guide unit 3 has a fixed base 31, two guide blocks 32, 32, one left and one right, placed on the fixed base 31, a locating block 33 fixed around the guide blocks 32, 32 and the fixed base 31, a toothed rod 34 engaging a rack on one guide block 32 and a moving block 35. The fixed base 31 has an annular projection 311 extending down from its bottom surface, and a central hole 312 for the lift rod 5 to pass through. The two guide blocks 32, 32 respectively have a semi-cylindrical recess 321 with a half female thread formed on an inner wall thereof, and a cavity 322 opening to the right side for a coil spring 324 to fit therein and a screw 323 engaging a threaded hole in the wall of the housing 1 to adjustably press the spring 324. The left guide blocks 32 have a rack 325 to engage one of longitudinal teeth of the toothed rod 34 which extends out of the housing 1 and is combined with a handle 342 to rotate the toothed rod 34. The locating block 33 has an L-shaped cross-sectional contour. The two moving blocks 35, 35 are shaped as an inverted L, having a rack 351 on a bottom surface of the left portion thereof to engage the toothed rod 34. The bottom of the right portion of the moving blocks are fixed on top of the right guide block 32 so that the moving blocks 35, 35 and the right guide block 32 move together.

The outer cap 4 forms a closure for the top end of the housing 1, having a central hole for the lift rod 5 to pass therethrough.

The lift rod 5 has its longitudinal body cut with a male thread. A flat supporting seat 51 is disposed at the top of lift rod 5 and two longitudinal straight slots 53, 53 are formed along the lift rod's longitudinal body for receipt of the keys 24, 24 therein, so that the lift rod 5 and the worm gear 22 rotate together.

In assembling, first, the spring 15 is placed in the recess 16, then the worm gear 22 is put on the annular ridge 11 in the lower chamber 13 with help of a bearing, and then the worm 21 is placed to engage the worm gear 22. Next, the turning handle 23 is pivotally combined with an outer end of the worm gear 22 in the outside of the housing 1. The fixed base 31 of the guide unit 3 is placed on the annular ridge 12 in the upper chamber 14, with the annular projection 311 fitting around a bearing combined on an upper end of the worm gear 22. Then the two guide blocks 32, 32 are mounted on the fixed base 31 by means of the locating block 33 so as to move laterally. The two springs 324, 324 are placed in the cavities 322, 322 and are pressed by the two screws 324, 324 passing through the wall of the housing 1. Next, the toothed rod 34 is placed on the left guide block 32, with the longitudinal teeth 341 engaging the rack 325. Then, a handle 342 is combined with the toothed rod 34 so as to rotate the rod 34. After that the two moving blocks 35, 35 are placed on the toothed rod 34, letting the racks 351, 351 of the moving blocks 35, 35 engage one of the long teeth 341 and the bottoms of the right portions of the blocks 35, 35 firmly fixed with the top surface of the right guide block 32. Next, the outer cap 4 is placed on the top of the housing 1 and the lift rod 5 is inserted downward through the central hole of the cap 4, the threaded notches 321, 321 of the guide blocks 32, 32, and the central hole 312 of the fixed base 31, with the slots 53, 53 of the lift rod sliding down along the keys 24, 24 of the worm gear 22 until the bottom of the rod 5 is received by the spring 15.

Figure 4:
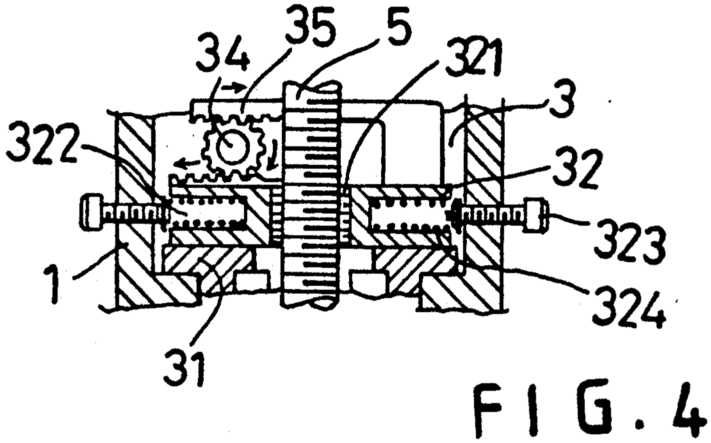

In use, the two screws 323, 323 are adjusted to move the guide blocks 32, 32 such that the female threads of the recessed 321, 321 of the guide blocks 32, 32 engage the male thread 52 of the lift rod 5. Then the turning handle 23 is operated to rotate the worm 21, which then rotates the worm gear 22. As the worm gear 22 rotates, the lift rod 5 is then rotated by the worm gear 22 by means of the keys 24, 24 fitting in the slots 53, 53, and gradually the lift rod lifted up by the female thread of the notches 321, 321 of the guide blocks 32, 32. As a result, a heavy object disposed on the seat 51 can be gradually lifted up. If the life rod 5 is to be lowered down, as shown in FIG. 4, the handle 342 of the guide unit 3 is operated to withdraw the guide blocks 32, 32 from engagement with the lift rod 5. The female thread of the guide blocks 32, 32 disengages from the male thread 52 of the lift rod 5, which then moves quickly downward, guided by the slots sliding along the keys 24, 24 of the worm gear 22, owing to its own weight and/or the weight of the load, and is received by the spring 15.

While the preferred embodiments of the invention have been described above, it will be recognized and understood that various modifications may be made therein and the appended claims are intended to cover all such modifications which may fall within the spirit and scope of the invention.

What is claimed is:

1. A jack comprising:

a longitudinally extended tubular housing having one open end, said tubular housing being defined by a cylindrically shaped wall closed on one end thereof by an end wall member, said tubular housing having a pair of longitudinally spaced annular ridges formed on an inner surface of said cylindrically shaped wall to define a lower chamber therebetween;

a cap member disposed on said one open end of said tubular housing for forming a closure therefor, said cap member and an upper one of said pair of annular ridges defining an upper chamber therebetween;

a lift rod member extending longitudinally through a central through opening formed in said cap member, said lift rod member having a male thread formed on an outer surface thereof between opposing ends of said lift rod member, said lift rod member having a pair of slotted recesses formed on opposing sides thereof and extending longitudinally between opposing ends of said lift rod member;

transmission means disposed in said lower chamber for rotating said lift rod responsive to a manual rotative force applied to said transmission means, said transmission means including a worm gear rotatively coupled to said lift rod member by a pair of keys extending into a central opening formed in said worm gear for respective engagement within said slotted recesses of said lift rod member, said lift rod member being slidably displaceable within said central opening of said worm gear, said transmission means further including a worm engaged with said worm gear and having a shaft portion extending through said cylindrically shaped wall for coupling with a first handle member; and, guide means disposed in said upper chamber for releasable coupling with said lift rod member, said guide means including (1) a fixed base member supported by said upper annular ridge, (2) a first guide block slidingly coupled to said fixed base member on a first side of said upper chamber and having a first toothed rack formed on an upper surface thereof, said first guide block having a female thread portion disposed in a semi-cylindrical recess formed in one end thereof for releasable engagement with a respective side of said lift rod member, (3) a second guide block slidingly coupled to said fixed base member on a second side of said upper chamber, said second guide block having a female thread portion disposed in a semi-cylindrical recess formed in one end thereof for releasable engagement with a respective side of said lift rod member, (4) a pair of moving blocks coupled to an upper surface of said second guide block, each of said pair of moving blocks having an arm portion extending from said second side of said upper chamber to said first side thereof, each of said arm portions having a second toothed rack formed on a bottom surface thereof, (5) spring bias means disposed within openings formed in said first and second guide blocks for biasing said female thread potions of said first and second guide blocks into respective threaded engagement with said male thread of said lift rod member to thereby provide vertical displacement of said lift rod member responsive to rotation of said first handle member, (6) a toothed rod member extending transversely through said first side of said upper chamber for engagement with said first and second toothed racks on opposing sides thereof to provide linear displacement of said first and second guide blocks in opposing directions, said toothed rod member having a shaft portion extending through said cylindrically shaped wall for engagement with a second handle member, wherein rapid downward vertical displacement of said lift rod member is provided by displacement of said first and second guide blocks to disengage said female threaded portions from said male thread of said lift rod member responsive to rotation of said second handle member.

* * * * *